US009763242B2

United States Patent
Fröberg Olsson et al.

(10) Patent No.: US 9,763,242 B2
(45) Date of Patent: Sep. 12, 2017

(54) CHANNEL-STATE INFORMATION REFERENCE SYMBOL SCHEDULING IN LICENSE-ASSISTED ACCESS LTE

(71) Applicant: Telefonaktiebolaget L M Ericsson (publ), Stockholm (SE)

(72) Inventors: Jonas Fröberg Olsson, Ljungsbro (SE); Håkan Andersson, Linköping (SE); John Skördeman, Brokind (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/783,293

(22) PCT Filed: Sep. 15, 2015

(86) PCT No.: PCT/EP2015/071095
§ 371 (c)(1),
(2) Date: Oct. 8, 2015

(87) PCT Pub. No.: WO2016/046026
PCT Pub. Date: Mar. 31, 2016

(65) Prior Publication Data
US 2016/0270036 A1   Sep. 15, 2016

Related U.S. Application Data

(60) Provisional application No. 62/055,706, filed on Sep. 26, 2014.

(51) Int. Cl.
*H04W 4/00* (2009.01)
*H04W 72/04* (2009.01)
(Continued)

(52) U.S. Cl.
CPC ........ *H04W 72/042* (2013.01); *H04B 7/0626* (2013.01); *H04L 5/0051* (2013.01);
(Continued)

(58) Field of Classification Search
CPC . H04W 72/042; H04W 24/10; H04W 72/082; H04W 48/12; H04L 5/0051; H04L 27/0006; H04L 5/001
See application file for complete search history.

(56) References Cited

U.S. PATENT DOCUMENTS

2014/0036881 A1*  2/2014  Kim ..................... H04L 5/001
                                                              370/336
2014/0071931 A1    3/2014  Lee et al.
(Continued)

FOREIGN PATENT DOCUMENTS

WO    WO 2013/072837 A1    5/2013

OTHER PUBLICATIONS

International Search Report and Written Opinion Corresponding to International Application No. PCT/EP2015/071095; Date of Mailing: Dec. 16, 2015; 17 Pages.
(Continued)

*Primary Examiner* — Abdelnabi O Musa
(74) *Attorney, Agent, or Firm* — Sage Patent Group

(57) ABSTRACT

Methods by network nodes and related network nodes are disclosed for configuring a user equipment (UE) in a telecommunications system. The UE is configured with a Channel-State Information (CSI) measurement resource with subframe-less configuration. A grant is sent on Enhanced Physical Downlink Control Channel ((e)PDCCH) for the UE with a Radio Network Temporary Identifier (RNTI_CSI) including specification of subframe configuration of CSI-measurement resources. A CSI-reference signal (CSI-RS) is sent according to a desired scheme in subframes indicated by the subframe configuration. Corresponding methods by UEs and related UEs are also disclosed.

28 Claims, 5 Drawing Sheets

(51) Int. Cl.
| | |
|---|---|
| *H04L 27/00* | (2006.01) |
| *H04W 24/10* | (2009.01) |
| *H04B 7/06* | (2006.01) |
| *H04W 72/08* | (2009.01) |
| *H04L 5/00* | (2006.01) |
| *H04W 48/12* | (2009.01) |

(52) U.S. Cl.
CPC ......... *H04L 27/0006* (2013.01); *H04W 24/10* (2013.01); *H04W 72/082* (2013.01); *H04L 5/001* (2013.01); *H04W 48/12* (2013.01)

(56) References Cited

U.S. PATENT DOCUMENTS

| | | | | |
|---|---|---|---|---|
| 2015/0131579 A1* | 5/2015 | Li | ............ | H04L 1/0072 370/329 |
| 2015/0172035 A1* | 6/2015 | Xu | ............ | H04L 5/0073 370/329 |
| 2015/0223208 A1* | 8/2015 | Park | ............ | H04L 5/001 370/329 |
| 2015/0312958 A1* | 10/2015 | Cheng | ............ | H04B 7/0413 370/252 |
| 2015/0319718 A1* | 11/2015 | Yang | ............ | H04W 28/18 370/252 |

OTHER PUBLICATIONS

3rd Generation Partnership Project; Technical Specification Group Radio Access Network; Evolved Universal Terrestrial Radio Access (E-UTRA); Physical channels and modulation (Release 12), 3GPP TS 36.211, V12.2.0, Jun. 16, 2014, 121 pages.

3rd Generation Partnership Project; Technical Specification Group Radio Access Network; Evolved Universal Terrestrial Radio Access (E-UTRA); Physical layer procedures (Release 12), 3GPP TS 36.213, V12.2.0, Jun. 30, 2014, 207 pages.

Ericsson, "PHY-layer Options to Support CSI Measurement and Reporting for LAA", 3GPP TSG RAN WG1 Meeting #80, Athens, Greece, Feb. 9-13, 2015, R1-150588.

Ericsson, "Further discussion on support of CSI Measurement and Reporting for LAA", 3GPP TSG RAN WG1 Meeting #80bis, Belgrade, Serbia, Apr. 20-24, 2015, R1-152011.

3GPP, Technical Specification, "3rd Generation Partnership Project; Technical Specification Group Radio Access Network; Evolved Universal Terrestrial Radio Access (E-UTRA); Physical channels and modulation (Release 11)", 3GPP TS 36.211 V11.6.0 (Sep. 2014), 120 pp.

3GPP, Technical Specification, "3rd Generation Partnership Project; Technical Specification Group Radio Access Network; Evolved Universal Terrestrial Radio Access (E-UTRA); Physical layer procedures (Release 11)", 3GPP TS 36.213 V11.11.0 (Jun. 2015), 183 pp.

3GPP, Technical Specification, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.13.0 (Sep. 2015), 359 pp.

* cited by examiner

Send the grant on (e)PDCCH to UEs with RNTI = RNTI_CSI indicating subframe configuration — 300

FIGURE 3

Send the grant specifying a single subframe where CSI-measurement resources are present — 400

FIGURE 4

Send the grant specifying one subframe for CSI-RS measurement resource and one subframe for CSI-IM resource — 500

FIGURE 5

Send a plurality of grants indicating different subframes for CSI-measurement resources for a plurality of groups of UEs, where the UEs within a group use the same subframes for the CSI-measurement resources — 600

FIGURE 6

Send the grant specifying a subframe offset to UEs that are pre-configured with a CSI-measurement resource periodicity but not a subframe offset — 700

FIGURE 7

800 — Send the grant specifying an indication of subframe for the end of CSI-measurement resources

FIGURE 8

900 — Receive a grant on (e)PDCCH to UEs with RNTI = RNTI_CSI indicating subframe configuration

FIGURE 9

1000 — Receive a grant specifying a single subframe where CSI-measurement resources are present

FIGURE 10

1100 — Receive a grant specifying one subframe for CSI-RS measurement resource and one subframe for CSI-IM resource

FIGURE 11

1200 — Receive a grant specifying a subframe offset that is pre-configured with a CSI-measurement resource periodicity but not a subframe offset

FIGURE 12

1300 — Receive a grant specifying an indication of subframe for the end of CSI-measurement resources

CHANNEL-STATE INFORMATION REFERENCE SYMBOL SCHEDULING IN LICENSE-ASSISTED ACCESS LTE

CROSS REFERENCE TO RELATED APPLICATIONS

This application is a 35 U.S.C. §371 national stage application of PCT International Application No. PCT/EP2015/071095, filed on Sep. 15, 2015, which itself claims priority to U.S. provisional Application No. 62/055,706, filed Sep. 26, 2014, the disclosure and content of both of which are incorporated by reference herein in their entirety.

TECHNICAL FIELD

The present disclosure is directed to communications and, more particularly, to wireless communication methods, networks, and network nodes.

BACKGROUND

In many wireless communications systems the CSI (Channel-State Information) feedback is crucial for obtaining good performance. Reference signals (RS) are transmitted which are used to estimate the channel state. The feedback reporting typically includes a CQI (Channel-Quality Indicator) and RI (Rank Indicator) value. More detailed reports may include frequency-selective CQI and/or PMI (Pre-coding Matrix Indicator) values.

The 3rd-Generation Partnership Project (3GPP) so-called Long-Term Evolution (LTE) systems support CSI-reporting schemes that rely on the reference symbols being transmitted periodically, where the cell-specific reference symbols (CRS) are sent every subframe while CSI-RS can be sent with a larger periodicity. User equipments (UEs) using transmission mode 10 (TM10) can rely on CSI-RS resources while other UEs typically use the CRS at least for interference measurements.

TM10 UEs can be configured to report CSI for multiple CSI-processes, which each may have different CSI-measurement resources. A CSI-measurement resource can consist of a CSI-RS resource and a CSI-IM (CSI interference measurement) resource. Both the CSI-RS and the CSI-IM resources are characterized (among other things) by a subframe configuration. The subframe configuration specifies a subframe periodicity and a subframe offset that specify for the UE at which time instances the respective measurement resources are available.

License-Assisted Access via LTE (LAA-LTE) has recently been proposed as a technology for co-existence on unlicensed carriers with, e.g., WiFi. On an unlicensed carrier all data transmissions are to be controlled by a Listen-Before-Talk (LBT) mechanism, while control and management signaling can be sent without LBT at maximum duty cycle of 5% within an observation period of 50 ms. The LBT is a functionality which means that the channel is assessed to be clear before transmission begins. Since CSI-RS can be considered a type of control/management signaling, LAA-LTE may send CSI-RS without LBT and may hence preserve the CSI-reporting schemes for TM10 UEs provided that the duty cycle of 5% is not exceeded. For example, transmission of CSI-RS may occur in a subframe every 20 ms.

The approaches described in the Background section could be pursued, but are not necessarily approaches that have been previously conceived or pursued. Therefore, unless otherwise indicated herein, the approaches described in the Background section are not prior art to the claims in this application and are not admitted to be prior art by inclusion in the Background section.

SUMMARY

Some embodiments of the present disclosure are directed to a method by a network node for configuring a user equipment (UE) in a telecommunications system. The method includes configuring the UE with a Channel-State Information (CSI) measurement resource with subframe-less configuration, sending a grant on Enhanced Physical Downlink Control Channel ((e)PDCCH) for the UE with a Radio Network Temporary Identifier (RNTI_CSI) including specification of subframe configuration of CSI measurement resources, and sending a CSI-reference signal (CSI-RS) according to a desired scheme in subframes indicated by the subframe configuration.

A potential advantage of these and other embodiments of the present disclosure is that CSI-RS may be sent aperiodically and using an LBT mechanism. Hence, the network node has full control over when CSI-measurement resources are present, which in turn gives the potential advantage of more accurate CSI measurements in the UE since the LBT mechanism assures that no other transmitter has accessed the medium. A further potential advantage is that it is possible to receive CSI feedback in the network node earlier compared to when the CSI-RS are transmitted periodically since the transmission can be aligned with the start of the data transmission.

Some other embodiments of the present disclosure are directed to a method by a UE for being configured by a network node of a telecommunications system. The method includes receiving from the network node a configuration of CSI-measurement resources with subframe-less configuration. Based on detecting a RNTI_CSI grant in the received configuration, the method performs CSI measurements according to a subframe configuration indicated by the RNTI_CSI grant and the subframe-less configuration for CSI-measurement resources.

Some other embodiments of the present disclosure are directed to a network node for configuring a UE in a telecommunications system. The network node includes a transceiver configured to provide radio communications with the UE, and a processor coupled to the transceiver. The processor configures the UE with a CSI measurement resource with subframe-less configuration, sends a grant through the transceiver on (e)PDCCH for the UE with a RNTI_CSI including specification of subframe configuration of CSI measurement resources, and sends through the transceiver a CSI-RS according to a desired scheme in subframes indicated by the subframe configuration.

Some other embodiments of the present disclosure are directed to a network node for configuring a UE in a telecommunications system. The network node is adapted to configure the UE with a CSI measurement resource with subframe-less configuration, send a grant through the transceiver on (e)PDCCH for the UE with a RNTI_CSI including specification of subframe configuration of CSI measurement resources, and send through the transceiver a CSI-RS according to a desired scheme in subframes indicated by the subframe configuration.

Some other embodiments of the present disclosure are directed to a UE configurable by a network node of a telecommunications system. The UE includes a transceiver configured to provide radio communications with the network node and a processor coupled to the transceiver. The processor is configured to receive from the network node a configuration of CSI-measurement resources with subframe-less configuration. Based on detecting a RNTI_CSI grant in the received configuration, the process is configured to perform CSI measurements according to a subframe configuration indicated by the RNTI_CSI grant and the subframe-less configuration for CSI-measurement resources.

Some other embodiments of the present disclosure are directed to a UE configurable by a network node of a telecommunications system. The UE is adapted to receive from the network node a configuration of CSI-measurement resources with subframe-less configuration, and based on detecting a RNTI_CSI grant in the received configuration, perform CSI measurements according to a subframe configuration indicated by the RNTI_CSI grant and the subframe-less configuration for CSI-measurement resources.

Other methods, network nodes, and UEs according to embodiments of the invention will be apparent to one with skill in the art upon review of the following drawings and detailed description. It is intended that all such additional methods, network nodes, and UEs be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings:

FIGS. 1 and 3-8 are flowcharts of operations and methods by an eNB configured according to some embodiments;

FIGS. 2 and 9-13 are flowcharts of operations and methods by a UE configured according to some embodiments;

DETAILED DESCRIPTION

Figure 1:
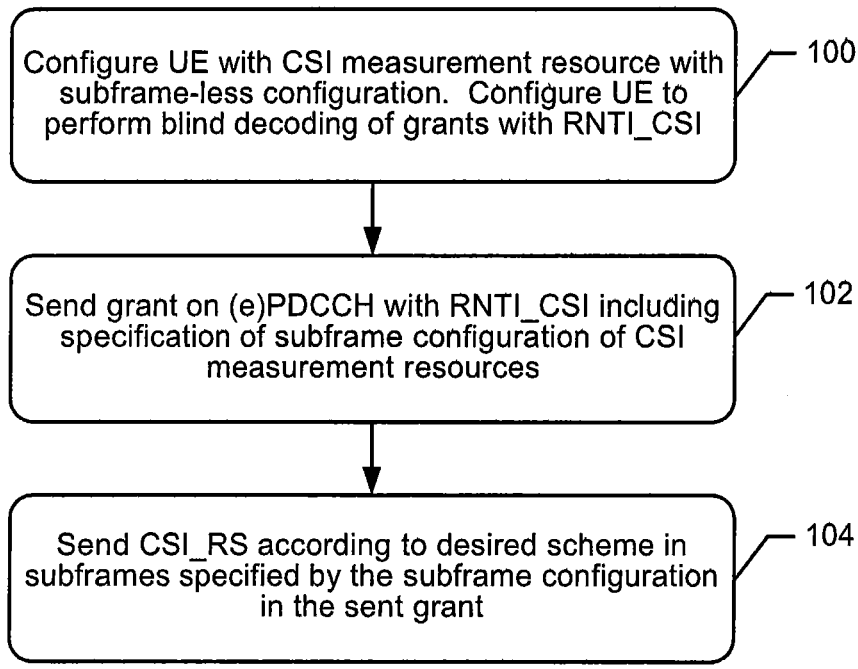
Figure 2:
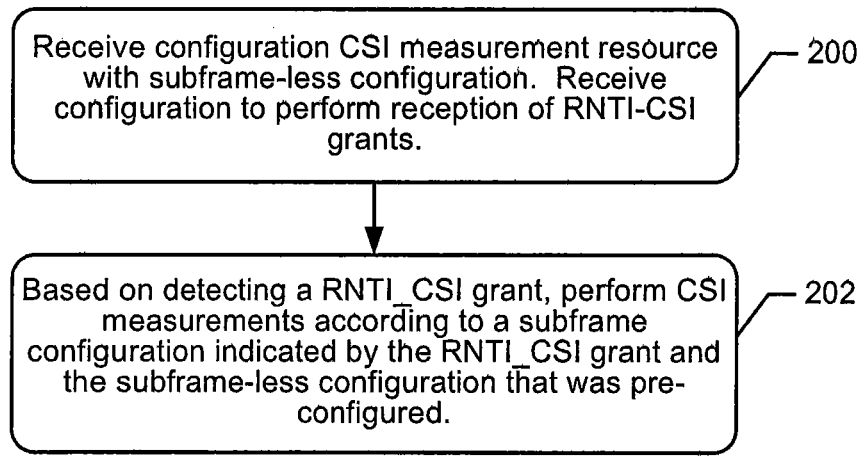

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Although various embodiments are disclosed herein in the context of being performed by a UE and/or a network node, they are not limited thereto and instead can be performed in any type of electronic communication device or system.

Potential Problems with Existing Approaches

There are several problems related to CSI-reporting based on transmission of CSI-RS as control signaling without LBT. The problems may include that the CSI-reporting schemes become less flexible due to the duty-cycle limit of 5%.

The quality of the CSI measurements may suffer when there is no LBT since another transmitter, e.g., WiFi, may have accessed the channel during the measurement period. A UE typically relies on a sequence of CSI measurements and may apply filtering over time. Hence, the reported CSI may repeatedly be less accurate if another transmitter has accessed the channel during one, or several, of the CSI measurement instances.

A problem may also arise because there is no CSI available right when the transmitter has grabbed the channel after an LBT instance with the intention of sending data.

Embodiments of the Present Disclosure may Overcome These Potential Problems

Embodiments of the present disclosure may overcome one or more of the potential problems explained above with existing approaches by relaxing the constraints of the CSI-measurement resource configuration by removing the subframe configuration. Instead, an explicit message is sent to the UE indicating when CSI-measurement resources are present and transmit those using a listen-before-talk mechanism.

A potential advantage of one or more embodiments of the present disclosure is that CSI-RS may be transmitted aperiodically and using an LBT mechanism. Hence, the evolved Node B (eNB) network node has knowledge of when CSI-measurement resources are present, which in turn gives the potential advantage of more accurate CSI measurements in the UE since the LBT mechanism guarantees that no other transmitter has accessed the medium. A further potential advantage is that it is possible to receive CSI feedback in the eNB earlier compared to when the CSI-RS/CSI-IM are transmitted periodically since the transmission can be aligned with the start of the data transmission.

eNB Operations and Methods According to the Present Disclosure

FIGS. 1 and 3-8 are flowcharts of operations and methods by an eNB configured according to some embodiments. Referring to FIGS. 1 and 3-8, the eNB configures (block 100) a UE, or a plurality of UEs, with CSI-measurement resource(s) with subframe-less configuration.

In a further example embodiment, configuration of a UE can include the eNB communicating a CSI-RS measurement resource configuration that contains information identifying any one or more of the following:

CSI-RS resource configuration identity, if the UE is configured in transmission mode 10.

Number of CSI-RS ports. The allowable values and port mappings may be defined based on subsection 6.10.5 of 3GPP TS 36.211, "Evolved Universal Terrestrial Radio Access (E-UTRA); Physical Channels and Modulation", Ver. 11.

CSI-RS Configuration, which may be defined based on Table 6.10.5.2-1 and Table 6.10.5.2-2 in 3GPP TS 36.211, "Evolved Universal Terrestrial Radio Access (E-UTRA); Physical Channels and Modulation", Ver. 11.

UE assumption on reference PDSCH transmitted power for CSI feedback $P_c$, if the UE is configured in transmission mode 9.

UE assumption on reference PDSCH transmitted power for CSI feedback $P_c$ for each CSI process, if the UE is configured in transmission mode 10.

Pseudo-random sequence generator parameter, $n_{ID}$. The allowable values may be defined based on 3GPP TS 36.331, "Evolved Universal Terrestrial Radio Access (E-UTRA); Radio Resource Control (RRC) protocol specification".

Higher-layer parameter qcl-CRS-Info-r11 for Quasi co-location type B UE assumption of CRS antenna ports and CSI-RS antenna ports with the following parameters, if the UE is configured in transmission mode 10:
qcl-ScramblingIdentity-r11.
crs-PortsCount-r11.
mbsfn-SubframeConfigList-r11.

It is noted that the item "CSI RS subframe configuration $I_{CSI-RS}$" as defined by 3GPP TS 36.213, "Evolved Universal Terrestrial Radio Access (E-UTRA); Physical layer procedures", Ver. 11, is not included above.

The CSI-IM resource configuration may include:
Zero-power CSI RS Configuration, which may be defined based on Table 6.10.5.2-1 and Table 6.10.5.2-2 in 3GPP TS 36.213, "Evolved Universal Terrestrial Radio Access (E-UTRA); Physical layer procedures", Ver. 11).

It is noted that the item "Zero-power CSI RS subframe configuration $I_{CSI-RS}$" as defined for the zero-power CSI-IM resource configuration in 3GPP TS 36.213, "Evolved Universal Terrestrial Radio Access (E-UTRA); Physical layer procedures", Ver. 11, is not included here.

The UEs are configured to do blind decoding of Enhanced Physical Downlink Control Channel ((e)PDCCH) grants for reserved Radio Network Temporary Identifier (RNTI)=RNTI_CSI.

With continuing reference to FIG. 1, the eNB sends (block 102) a grant on (e)PDCCH with RNTI_CSI including specification of subframe configuration of CSI measurement resources. For example, the eNB can send (block 300) a grant on (e)PDCCH to UEs with RNTI=RNTI_CSI indicating subframe configuration $I_{CSI-RS}$.

The eNB then sends (block 104) CSI-RS according to desired scheme in subframes indicated by the subframe configuration.

In some embodiments, the periodicity in the subframe configuration is not present. In such embodiments, the eNB can send (block 400) grant that specifies a single subframe where CSI-measurement resources are present.

In other embodiments, the eNB sends (block 500) a grant that specifies one subframe for CSI-RS measurement resource and one subframe for CSI-IM resource.

In some embodiments, the UEs may be configured with two or more RNTI_CSI. In such embodiments, an eNB may send (block 600) two or more grants indicating different subframes for CSI-measurement resources for two or more groups of UEs, where UEs within a group use the same subframes for the CSI-measurement resources.

In some other embodiments, the UEs are pre-configured in block 1 with a CSI-measurement resource periodicity but not a subframe offset. In such embodiments the eNB can send (block 700) a grant that specifies subframe offset to UEs that are determined to be pre-configured with a CSI-Measurement resource periodicity but not a subframe offset.

In yet other embodiments, the eNB sends (block 800) the grant including an indication of subframe for the end of CSI-measurement resources. For example, the grant may specify that the CSI-measurement resources are those that fulfill the following condition:

$$10*SFN+SF(\text{mod } T\_period)=T\_offset;$$

$$10*SFN+SF<SFN\_grant*10+SF\_grant+N\_offset;$$

where:
SFN: System frame number
SF: Subframe number
T_period: CSI-measurement resource period
T_offset: CSI-measurement resource subframe offset
SFN_grant: The SFN in which the grant was sent
SF_grant: The SF in which the grant was sent, and
N_offset: Number of SFs for which CSI-measurement resources are present as specified by T_period and T_offset.

In an LTE system the CSI-measurement resource indication is sent on the (e)PDCCH using a new DCI format or an extension of an existing format. However, it could also be sent on a new physical channel, i.e., something other than (e)PDCCH.

UE Operations and Methods According to the Present Disclosure

FIGS. 2 and 9-13 are flowcharts of operations and methods by a UE configured according to some embodiments. Referring to FIGS. 2 and 9-13, the UE receives (block 200) a configuration of CSI-measurement resources with subframe-less configuration. The UE responsively performs reception of RNTI_CSI grants.

Based on detecting a RNTI_CSI grant, the UE performs (block 200) CSI measurements according to a subframe configuration indicated by the RNTI_CSI grant and the subframe-less configuration for CSI-measurement resources.

In one embodiment to receive the configuration of CSI-measurement resources with subframe-less configuration, the UE receives (block 900) a grant on (e)PDCCH with RNTI=RNTI_CSI indicating subframe configuration $I_{CSI-RS}$.

In another embodiment to receive the configuration of CSI-measurement resources with subframe-less configuration, the UE receives (block 1000) a grant specifying a single subframe where CSI-measurement resources are present. The UE responsively performs a measurement using the CSI-measurement resources in the single subframe specified by the grant.

In another embodiment to receive the configuration of CSI-measurement resources with subframe-less configuration, the UE receives (block 1100) a grant specifying one subframe for a CSI-RS measurement resource and one subframe for CSI-IM resource. The UE responsively performs measurements based on the one subframe for the CSI-RS measurement resource and the one subframe for CSI-IM resource specified by the grant.

In another embodiment to receive the configuration of CSI-measurement resources with subframe-less configuration, the UE receives (block 1200) a grant specifying a subframe offset that is pre-configured with a CSI-measurement resource periodicity but not a subframe offset. The UE responsively performs a measurement using the CSI-measurement resource at the subframe offset specified by the grant.

In another embodiment to receive the configuration of CSI-measurement resources with subframe-less configuration, the UE receives (block 1300) a grant specifying an indication of subframe for the end of CSI-measurement resources. The UE responsively performs a measurement using the CSI-measurement resources in the subframe specified by the grant.

SUMMARY

Various embodiments of the present disclosure are applicable to a LAA-LTE system. As explained above, an eNB signals CSI-measurement resources which are not semi-statically allocated in terms of subframe configuration. The eNB configures a UE with CSI-measurement resources without determining a subframe configuration in a first step (e.g., block 100 of FIG. 1). The subframe configuration is dynamically indicated (sent) to the UE in a second step (e.g., block 102 of FIG. 1).

Example User Equipment and Network Node

Figure 14:
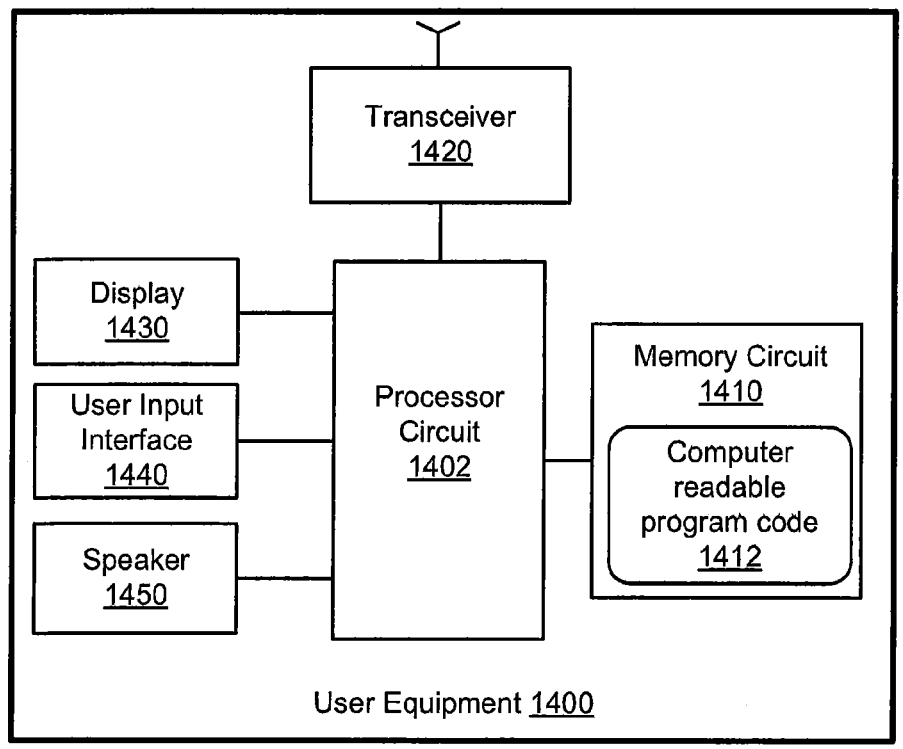
FIG. 14 is a block diagram of a UE configured according to some embodiments.

FIG. 14 is a block diagram of a UE 1400, for use in a telecommunications system, that is configured to perform operations according to one or more embodiments disclosed herein. The UE 1400 includes a transceiver 1420, a processor circuit 1402, and a memory circuit 1410 containing computer-readable program code 1412. The UE 1400 may further include a display 1430, a user-input interface 1440, and a speaker 1450.

The transceiver 1420 is configured to communicate with a network node, the example of which is an eNB, through a wireless air interface using one or more of the radio-access technologies disclosed herein. The processor circuit 1402 may include one or more data-processing circuits, such as a general-purpose and/or special-purpose processor, e.g., microprocessor and/or digital signal processor. The processor circuit 1402 is configured to execute the computer-readable program code 1412 in the memory circuit 1410 to perform at least some of the operations described herein as being performed by a UE.

Figure 15:
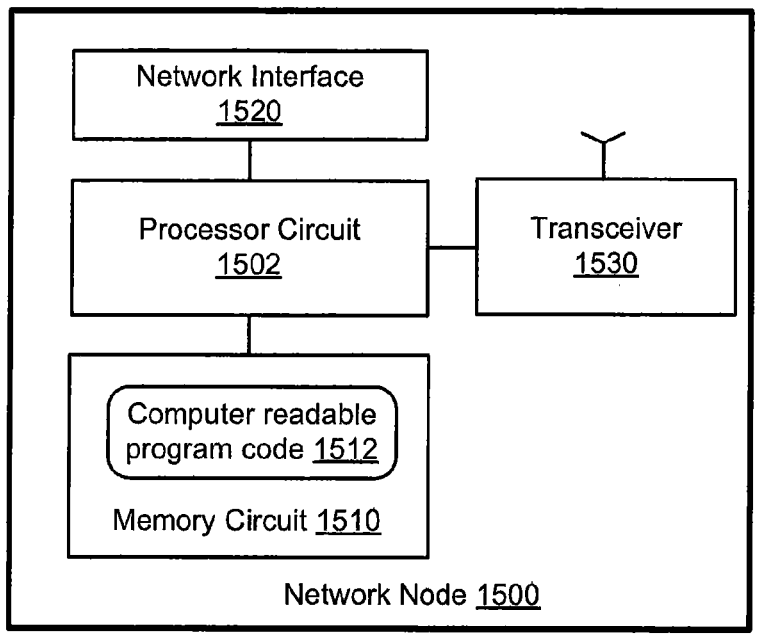
FIG. 15 is a block diagram of a network node configured according to some embodiments.

FIG. 15 is a block diagram of a network node 1500, for use in a telecommunications system, that is configured according to one or more embodiments disclosed herein for an eNB, radio-network node, or other network node. The network node 1500 can include a transceiver 1530, a network interface 1520, a processor circuit 1502, and a memory circuit 1510 containing computer-readable program code 1512.

The transceiver 1530 is configured to communicate with the UE 1400 using one or more of the radio-access technologies disclosed herein, when the network node 1500 is a radio-network node. The processor circuit 1502 may include one or more data-processing circuits, such as a general-purpose and/or special-purpose processor, e.g., microprocessor and/or digital signal processor, that may be collocated or distributed across one or more networks. The processor circuit 1502 is configured to execute the computer-readable program code 1512 in the memory 1510 to perform at least some of the operations and methods of described herein as being performed by a network node. The network interface 1520 communicates with other network nodes and/or a core network.

Figure 16:
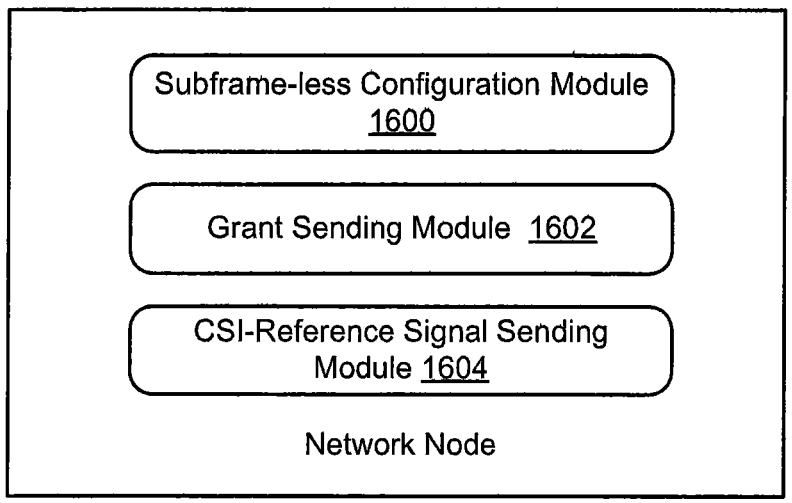
FIG. 16 illustrates modules residing in a network node according to some embodiments.

FIG. 16 illustrates modules residing in a network node, such as the network node 1500 of FIG. 15, that perform operations as disclosed herein according to some embodiments. The network node includes a subframe-less configuration module 1600, a grant-sending module 1602, and a CSI-reference signal-sending module 1604. The subframe-less configuration module 1600 configures the UE with a CSI-measurement resource with subframe-less configuration. The grant-sending module 1602 sends a grant on (e)PDCCH for the UE with a RNTI CSI including specification of subframe configuration of CSI-measurement resources. The CSI-reference signal-sending module 1604 sends a CSI-RS according to a desired scheme in subframes indicated by the subframe configuration. The modules 1600, 1602, and 1604 may perform other operations by a network node disclosed herein with regard to FIGS. 1 and 3-8.

Figure 17:
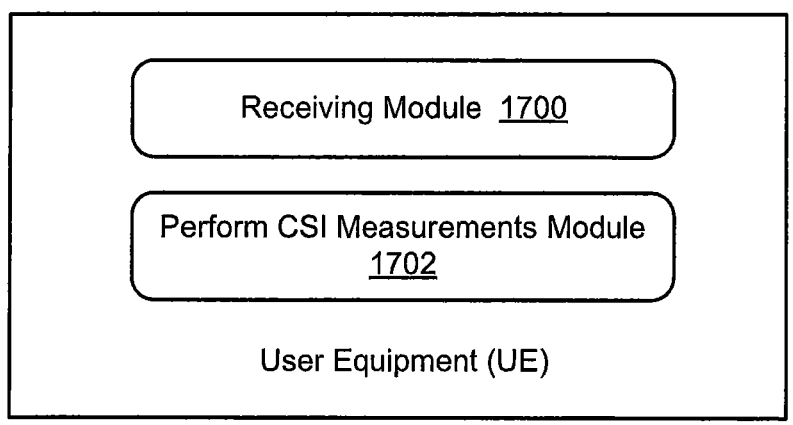
FIG. 17 illustrates modules residing in a UE according to some embodiments.

FIG. 17 illustrates modules residing in a UE, such as the UE 1400 of FIG. 1400, that perform operations as disclosed herein according to some embodiments. The UE includes a receiving module 1700 and a perform-CSI-measurements module 1702. The receiving module 1700 operates to receive from the network node a configuration of CSI-measurement resources with subframe-less configuration. The perform-CSI-measurements module 1702 operates to, based on detecting a RNTI_CSI grant in the received configuration, perform CSI measurements according to a subframe configuration indicated by the RNTI_CSI grant and the subframe-less configuration for CSI-measurement resources. The modules 1700 and 1702 may perform other operations by a UE disclosed herein with regard to FIGS. 2 and 9-13.

Abbreviations
CSI Channel-State Information
ePDCCH Evolved Physical Downlink Control CHannel
eNB LTE base station
IM Interference Measurement
LAA-LTE Licensed-Assisted Access LTE
LBT Listen Before Talk
LTE Long-Term Evolution
PDCCH Physical Downlink Control CHannel
RNTI Radio Network Temporary Identifier
RS Reference Signal
SF Subframe
SFN System Frame Number
UE User Equipment Further Definitions and Embodiments In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer-program products. It is understood that a block of the block diagrams and/or flowchart illustrations, and combinations of blocks in the block diagrams and/or flowchart illustrations, can be implemented by computer-program instructions that are performed by one or more computer circuits. These computer-program instructions may be provided to a processor circuit of a general-purpose computer circuit, special-purpose computer circuit, and/or other programmable data-processing circuit to produce a machine, such that the instructions, which execute via the processor of the computer and/or other programmable data-processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer-program instructions may also be stored in a tangible non-transitory computer-readable medium that can direct a computer or other programmable data-processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A method for configuring a user equipment, UE, in a telecommunications system, the method comprising:

configuring, by a network node, the UE with a Channel-State Information, CSI, measurement resource with subframe-less configuration;

sending, by the network node, a grant on Enhanced Physical Downlink Control Channel, (e)PDCCH, for the UE with a Radio Network Temporary Identifier, RNTI_CSI including specification of subframe configuration of CSI measurement resources, by sending the grant specifying that the CSI-measurement resources are those that fulfill the following condition:

$$10*SFN+SF(\bmod\ T\ \text{period})=T\ \text{offset};$$

$$10*SFN+SF<SFN\ \text{grant}*10 + SF\ \text{grant}+N\ \text{offset};$$

wherein:
SFN corresponds to a System frame number, SF corresponds to a Subframe number, mod T period corresponds to a CSI-measurement resource period, T offset corresponds to CSI-measurement resource subframe offset, SFN grant corresponds to the SFN in which the grant was sent, SF grant corresponds to the SF in which the grant was sent, and N offset corresponds to a number of SFs for which CSI-measurement resources are present as specified by mod T period and T offset; and sending, by the network node, a CSI-reference signal, CSI-RS, according to a desired scheme in subframes indicated by the subframe configuration.

2. The method of claim 1, wherein the sending the grant on the (e)PDCCH for the UE with the RNTI_CSI including specification of subframe configuration of CSI measurement resources, comprises:

sending the grant on the (e)PDCCH to UEs with RNTI=RNTI_CSI indicating a subframe configuration $I_{CSI\text{-}RS}$.

3. The method of claim 1, wherein the sending the grant on the (e)PDCCH for the UE with the RNTI_CSI including specification of subframe configuration of CSI measurement resources, comprises:

sending the grant specifying a single subframe where CSI-measurement resources are present.

4. The method of claim 1, wherein the sending the grant on the (e)PDCCH for the UE with the RNTI_CSI including specification of subframe configuration of CSI measurement resources, comprises:

sending the grant specifying one subframe for CSI-RS measurement resource and one subframe for CSI-Interference Measurement, CSI-IM, resource.

5. The method of claim 1, further comprising:
sending a plurality of grants indicating different subframes for CSI-measurement resources for a plurality of groups of UEs, where the UEs within a group are to use the same subframes for the CSI-measurement resources.

6. The method of claim 1, wherein the sending the grant on the (e)PDCCH for the UE with the RNTI_CSI including specification of subframe configuration of CSI measurement resources, comprises:
sending the grant specifying a subframe offset to UEs that are determined to be pre-configured with a CSI-measurement resource periodicity but not a subframe offset.

7. The method of claim 1, wherein the sending the grant on the (e)PDCCH for the UE with the RNTI_CSI including specification of subframe configuration of CSI measurement resources, comprises:
sending the grant specifying an indication of subframe for an end of CSI-measurement resources.

8. A method for configuring a user equipment, UE by a network node of a telecommunications system, the method comprising:
receiving, by the UE and from the network node a configuration of CSI-measurement resources with subframe-less configuration,
wherein the CSI-measurement resources are those that fulfill the following condition:

$$10*SFN+SF(\text{mod } T \text{ period}) = T \text{ offset};$$

$$10*SFN+SF < SFN \text{ grant}*10 + SF \text{ grant} + N \text{ offset};$$

wherein:
SFN corresponds to a System frame number, SF corresponds to a Subframe number, mod T period corresponds to a CSI-measurement resource period, T offset corresponds to CSI-measurement resource subframe offset, SFN grant corresponds to the SFN in which the grant was sent, SF grant corresponds to the SF in which the grant was sent, and N offset corresponds to a number of SFs for which CSI-measurement resources are present as specified by mod T period and T offset; and
based on detecting a RNTI_CSI grant in the received configuration, performing, by the UE, CSI measurements according to a subframe configuration indicated by the RNTI_CSI grant and the subframe-less configuration for CSI-measurement resources.

9. The method of claim 8, wherein the receiving from the network node the configuration of CSI-measurement resources with subframe-less configuration, comprises:
receiving a grant on (e)PDCCH with RNTI=RNTI_CSI indicating subframe configuration $I_{CSI-RS}$.

10. The method of claim 8, wherein the receiving from the network node the configuration of CSI-measurement resources with subframe-less configuration, comprises:
receiving a grant specifying a single subframe where CSI-measurement resources are present.

11. The method of claim 8, wherein the receiving from the network node the configuration of CSI-measurement resources with subframe-less configuration, comprises:
receiving a grant specifying one subframe for a CSI-RS measurement resource and one subframe for CSI-IM resource.

12. The method of claim 8, wherein the receiving from the network node the configuration of CSI-measurement resources with subframe-less configuration, comprises:
receiving a grant specifying a subframe offset that is pre-configured with a CSI-measurement resource periodicity but not a subframe offset.

13. The method of claim 8, wherein the receiving from the network node the configuration of CSI-measurement resources with subframe-less configuration, comprises:
receiving a grant specifying an indication of subframe for an end of CSI-measurement resources.

14. A network node in a telecommunications system, the network node comprising:
a transceiver configured to provide radio communications with a user equipment, UE; and
a processor coupled to the transceiver, wherein the processor is configured to perform operations comprising:
configuring the UE with a Channel-State Information, CSI, measurement resource with subframe-less configuration;
sending a grant through the transceiver on Enhanced Physical Downlink Control Channel, (e)PDCCH, for the UE with a Radio Network Temporary Identifier, RNTI_CSI including specification of subframe configuration of CSI measurement resources, by sending the grant specifying that the CSI-measurement resources are those that fulfill the following condition:

$$10*SFN+SF(\text{mod } T \text{ period}) = T \text{ offset};$$

$$10*SFN+SF < SFN \text{ grant}*10 + SF \text{ grant} + N \text{ offset};$$

wherein:
SFN corresponds to a System frame number, SF corresponds to a Subframe number, mod T period corresponds to a CSI-measurement resource period, T offset corresponds to CSI-measurement resource subframe offset, SFN grant corresponds to the SFN in which the grant was sent, SF grant corresponds to the SF in which the grant was sent, and N offset corresponds to a number of SFs for which CSI-measurement resources are present as specified by mod T period and T offset; and
sending through the transceiver a CSI-reference signal, CSI-RS, according to a desired scheme in subframes indicated by the subframe configuration.

15. The network node of claim 14, wherein the sending the grant through the transceiver on the (e)PDCCH for the UE with the RNTI_CSI including specification of subframe configuration of CSI measurement resources, comprises:
sending the grant on the (e)PDCCH to UEs with RNTI=RNTI_CSI indicating a subframe configuration $I_{CSI-RS}$.

16. The network node of claim 14, wherein the sending the grant through the transceiver on the (e)PDCCH for the UE with the RNTI_CSI including specification of subframe configuration of CSI measurement resources, comprises:
sending the grant specifying a single subframe where CSI-measurement resources are present.

17. The network node of claim 14, wherein the sending the grant through the transceiver on the (e)PDCCH for the UE with the RNTI_CSI including specification of subframe configuration of CSI measurement resources, comprises:
sending the grant specifying one subframe for CSI-RS measurement resource and one subframe for CSI-Interference Measurement, CSI-IM, resource.

18. The network node of claim 14, further comprising:
sending a plurality of grants indicating different subframes for CSI-measurement resources for a plurality of groups of UEs, where the UEs within a group are to use the same subframes for the CSI-measurement resources.

19. The network node of claim 14, wherein the sending the grant through the transceiver on the (e)PDCCH for the UE with the RNTI_CSI including specification of subframe configuration of CSI measurement resources, comprises:
sending the grant specifying a subframe offset to UEs that are determined to be pre-configured with a CSI-measurement resource periodicity but not a subframe offset.

20. The network node of claim 14, wherein the sending the grant through the transceiver on the (e)PDCCH for the UE with the RNTI_CSI including specification of subframe configuration of CSI measurement resources, comprises:
sending the grant specifying an indication of subframe for an end of CSI-measurement resources.

21. A network node for configuring a user equipment, UE, in a telecommunications system, the network node comprising a transceiver, a processor, and memory storing instructions that, when executed by the processor, cause the processor to perform operations comprising:
configuring the UE with a Channel-State Information, CSI, measurement resource with subframe-less configuration;
sending a grant through the transceiver on Enhanced Physical Downlink Control Channel, (e)PDCCH, for the UE with a Radio Network Temporary Identifier, RNTI_CSI including specification of subframe configuration of CSI measurement resources, by sending the grant specifying that the CSI-measurement resources are those that fulfill the following condition:

$10*SFN+SF(\mod T \text{ period})=T \text{ offset}$;

$10*SFN+SF<SFN \text{ grant}*10+SF \text{ grant}+N \text{ offset}$;

wherein:
SFN corresponds to a System frame number, SF corresponds to a Subframe number, mod T period corresponds to a CSI-measurement resource period, T offset corresponds to CSI-measurement resource subframe offset, SFN grant corresponds to the SFN in which the grant was sent, SF grant corresponds to the SF in which the grant was sent, and N offset corresponds to a number of SFs for which CSI-measurement resources are present as specified by mod T period and T offset; and
sending through the transceiver a CSI-reference signal, CSI-RS, according to a desired scheme in subframes indicated by the subframe configuration.

22. A user equipment, UE, that is configurable by a network node of a telecommunications system, the UE comprising:
a transceiver configured to provide radio communications with the network node; and
a processor coupled to the transceiver, wherein the processor is configured to perform operations comprising:
receiving from the network node a configuration of CSI-measurement resources with subframe-less configuration,
wherein the CSI-measurement resources are those that fulfill the following condition:

$10*SFN+SF(\mod T \text{ period})=T \text{ offset}$;

$10*SFN+SF<SFN \text{ grant}*10+SF \text{ grant}+N \text{ offset}$;

wherein:
SFN corresponds to a System frame number, SF corresponds to a Subframe number, mod T period corresponds to a CSI-measurement resource period, T offset corresponds to CSI-measurement resource subframe offset, SFN grant corresponds to the SFN in which the grant was sent, SF grant corresponds to the SF in which the grant was sent, and N offset corresponds to a number of SFs for which CSI-measurement resources are present as specified by mod T period and T offset; and
based on detecting a RNTI_CSI grant in the received configuration, performing CSI measurements according to a subframe configuration indicated by the RNTI_CSI grant and the subframe-less configuration for CSI-measurement resources.

23. The UE of claim 22, wherein the receiving from the network node the configuration of CSI-measurement resources with subframe-less configuration, comprises:
receiving a grant on (e)PDCCH with RNTI=RNTI_CSI indicating subframe configuration $I_{CSI-RS}$.

24. The UE of claim 22, wherein the receiving from the network node the configuration of CSI-measurement resources with subframe-less configuration, comprises:
receiving a grant specifying a single subframe where CSI-measurement resources are present.

25. The UE of claim 22, wherein the receiving from the network node the configuration of CSI-measurement resources with subframe-less configuration, comprises:
receiving a grant specifying one subframe for a CSI-RS measurement resource and one subframe for CSI-IM resource.

26. The UE of claim 22, wherein the receiving from the network node the configuration of CSI-measurement resources with subframe-less configuration, comprises:
receiving a grant specifying a subframe offset that is pre-configured with a CSI-measurement resource periodicity but not a subframe offset.

27. The UE of claim 22, wherein the receiving from the network node the configuration of CSI-measurement resources with subframe-less configuration, comprises:
receiving a grant specifying an indication of subframe for an end of CSI-measurement resources.

28. A user equipment, UE, that is configurable by a network node of a telecommunications system, wherein the UE comprises a processor and memory storing instructions that, when executed by the processor, cause the processor to perform operations comprising:
receiving from the network node a configuration of CSI-measurement resources with subframe-less configuration,
wherein the CSI-measurement resources are those that fulfill the following condition:

$10*SFN+SF(\mod T \text{ period})=T \text{ offset}$;

$10*SFN+SF<SFN \text{ grant}*10+SF \text{ grant}+N \text{ offset}$;

wherein:
SFN corresponds to a System frame number, SF corresponds to a Subframe number, mod T period corresponds to a CSI-measurement resource period, T offset corresponds to CSI-measurement resource subframe offset, SFN grant corresponds to the SFN in which the grant was sent, SF grant corresponds to the SF in which the grant was sent, and N offset corresponds to a number of SFs for which CSI-measurement resources are present as specified by mod T period and T offset; and based on detecting a RNTI_CSI grant in the received configuration, performing CSI measurements according to a subframe configuration indicated by the RNTI_CSI grant and the subframe-less configuration for CSI-measurement resources.

* * * * *